United States Patent [19]

Leu

[11] Patent Number: 4,508,523

[45] Date of Patent: Apr. 2, 1985

[54] DRIVE MEANS FOR THE SHAFT OF A MOBILE APPARATUS

[75] Inventor: Willy Leu, Pfäffikon, Switzerland

[73] Assignee: Ferag Ag, Hinwil, Switzerland

[21] Appl. No.: 484,841

[22] Filed: Apr. 14, 1983

[30] Foreign Application Priority Data

Apr. 20, 1982 [CH] Switzerland .................... 2381/82

[51] Int. Cl.³ ............................ F16H 7/14; F16H 7/24
[52] U.S. Cl. ................................ 474/115; 474/119; 474/150; 242/67.1 R
[58] Field of Search ............. 474/110, 115, 119, 121, 474/135, 137, 150; 242/67.1 R

[56] References Cited

U.S. PATENT DOCUMENTS

| 365,051 | 6/1887 | Crowell | 474/121 |
|---|---|---|---|
| 905,526 | 12/1908 | Hanson | 474/135 |
| 1,544,684 | 7/1925 | Roesen | 474/121 |
| 1,703,530 | 2/1929 | Hume | 474/121 |
| 1,721,691 | 7/1929 | Dennis | 474/121 |
| 1,812,538 | 6/1931 | Lockert et al. | 474/110 |
| 2,664,758 | 1/1954 | Smits | 474/121 |
| 2,953,813 | 9/1960 | Knowland | 474/110 |
| 4,010,883 | 3/1977 | Ritter | 474/121 |
| 4,360,170 | 11/1982 | Kuklies et al. | 242/67.1 R |

Primary Examiner—Stephen J. Novosad
Assistant Examiner—Bruce M. Kisliuk
Attorney, Agent, or Firm—Werner W. Kleeman

[57] ABSTRACT

The stationary drive station comprises a gear chain guided over three sprocket wheels. One sprocket wheel is driven by a drive motor. A tensioning wheel is rotatably journaled at a pivotably mounted lever acted upon by a tension spring. The tensioning wheel acts on the outer side of the gear chain and on the idle run thereof. The driving run of the gear chain extends at its outer side around part of the circumference of a further sprocket wheel. This further sprocket wheel is seated on a shaft carrying a winding core for winding-up printed products and other flat products. The shaft is journaled in a mobile frame which may be removed from the drive station. The driving connection between the gear chain and the further sprocket wheel can be released by upwardly pivoting a holding or holder structure about the axis of the one sprocket wheel driving the gear chain. The two remaining gear chain-sprocket wheels of the aforementioned three sprocket wheels are rotatably journaled at the holding structure. The driving connection between the gear chain and the further sprocket wheel can be rapidly and positively established and again released.

16 Claims, 3 Drawing Figures

DRIVE MEANS FOR THE SHAFT OF A MOBILE APPARATUS

CROSS REFERENCE TO RELATED APPLICATION

This application is related to the commonly assigned, copending U.S. application Ser. No. 06/432,557, filed Oct. 4, 1982, entitled "Apparatus For The Storage of Flat Products Arriving In An Imbricated Formation, Especially Printed Products".

BACKGROUND OF THE INVENTION

The present invention relates to a new and improved drive mechanism or apparatus for driving a shaft in a mobile apparatus.

In its more particular aspects, the drive mechanism of the present development is of the type comprising a drive unit releasably engageable with the shaft to be driven, the drive unit containing a drive chain, and at least two sprocket wheels guide the drive chain at an inner side thereof, one of the at least two sprocket wheels forming a driven sprocket wheel.

A drive mechanism of this kind is known, for example, from U.S. Pat. No. 3,762,662, granted Oct. 2, 1973, and is used for driving the shaft of a wind-up spool to wind-up a web of fabric. A first sprocket wheel is mounted to a shaft driven by a drive means. A second sprocket wheel is mounted at a driven or power take-off shaft and is driven by the first sprocket wheel by using a drive chain. The driven shaft is provided with clutch means for coupling the shaft of the wind-up spool with the driven shaft.

For exchanging a full wind-up spool against an empty spool the driving connection between the driven shaft and the shaft of the wind-up spool must be disengaged by actuating the clutch means. During the subsequent insertion of an empty wind-up spool the shaft thereof firstly must be brought into a position aligned with the driven shaft of the drive unit before the two shafts can be coupled to each other.

The establishment and the release of the driving connection between the driven shaft of the drive unit and the shaft of the wind-up spool thus requires a corresponding expense of work and time.

Another prior art construction of sheet winder is known from U.S. Pat. No. 4,150,797, granted Apr. 24, 1979.

SUMMARY OF THE INVENTION

Therefore, with the foregoing in mind it is a primary object of the present invention to provide a new and improved construction of drive mechanism which is not associated with the aforementioned limitations and drawbacks of the prior art constructions.

Another important object of the present invention aims at providing a new and improved drive mechanism which enables rapid, reliable and positive engagement and disengagement of the drive unit and of the shaft to be driven without any great operational expense.

Still a further significant object of the present invention is directed to a new and improved construction of drive mechanism which is relatively simple in construction and design, quite economical to manufacture, extremely easy to use, exceptionally reliable in operation, not readily subject to breakdown or malfunction, and requires a minimum of maintenance and servicing.

Now in order to implement these and still further objects of the invention, which will become more readily apparent as the description proceeds, the drive mechanism or apparatus of the present development is manifested by the features that, a further sprocket wheel is mounted on the shaft to be driven. The drive chain is engageable at its outer side with the further sprocket wheel so as to extend around part of the circumference thereof and is disengageable therefrom. Tensioning means are provided in order to maintain the drive chain in a tensioned state when out of engagement with the further sprocket wheel located on the shaft to be driven.

Since the drive chain can be brought into engagement at its outer side with a further sprocket wheel or gear mounted at the shaft to be driven, preferably by placing the drive chain into engaging contact with such further sprocket wheel, the shaft to be driven and the drive chain can be rapidly and positively engaged and again disengaged from each other without any difficulty. The tensioning means ensures that the drive chain will be brought into contact with part of the circumference of the further sprocket wheel by enlarging the driving run or strand thereof, while however the driving run or strand is stretched, and the entire drive chain remains in a tensioned state when the same is disengaged from the further sprocket wheel. Thus, the drive chain is ready to be applied at any time to the further sprocket wheel of another shaft.

Preferably, a drive chain is used which has a larger width than the sprocket wheel or gear on the shaft to be driven. By virtue of this measure the drive chain can positively and reliably engage the sprocket wheel or gear on the shaft to be driven even when the sprocket wheel and the drive chain are not in exact alignment during the coupling operation.

In a further preferred design of the drive mechanism or apparatus according to the invention, the drive chain can be displaced or adjusted between an idle or rest position and a driving position in which the drive chain engages the sprocket wheel or gear of the shaft to be driven. Preferably, the displacement is carried out by pivoting the drive chain. In such a design of the inventive drive mechanism the driving connection between the drive chain and the further sprocket wheel or gear on the shaft can be automatically established and again released in a positive manner.

The drive mechanism or apparatus according to the invention is particularly suitable for driving a winding core which is journaled or rotatably mounted in a mobile frame and constitutes part of a storage unit for flat products, particularly printed products.

Drive means as known, for example, from British Pat. Nos. 1,517,792 and 1,524,822 permit selectively establishing a driving connection between a driving shaft and a number of shafts to be driven. The latter are journaled in a holding structure which is pivotable about a stationary axis extending parallel to the driving shaft. A drive chain is guided over the shafts to be driven and the drive chain may be applied to the circumference of a sprocket wheel on the driving shaft by pivoting the holding structure. Measures are undertaken to ensure that the initially stationary drive chain is brought into correct engagement or mesh with the rotating sprocket wheel on the driving shaft when the shafts to be driven are coupled to the driving shaft.

The aforementioned drive means is thus devised to ensure, when necessary, a faultless coupling of the shafts to be driven to a single rotatably driven driving shaft. The shafts to be driven are stationary if there is neglected that they are pivotable about a stationary axis conjointly with their holding structure.

Contrary thereto, the drive mechanism according to the invention is intended to serve the purpose of driving the shafts of various mobile structural units or groups by means of a simply structured drive unit, which is preferably stationarily arranged, and which mobile structural units or groups are only joined or operatively associated with the drive unit for driving the related shaft, but otherwise are employed separately thereof.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a side view of a stationary drive station containing a drive mechanism constructed according to the invention and showing a drive chain thereof in an idle or rest position, the stationary drive station being intended for driving a winding core of a mobile storage unit for printed products or the like;

DETAILED DESCRIPTION OF THE PREFERRED EMBODIMENTS

Figure 1:
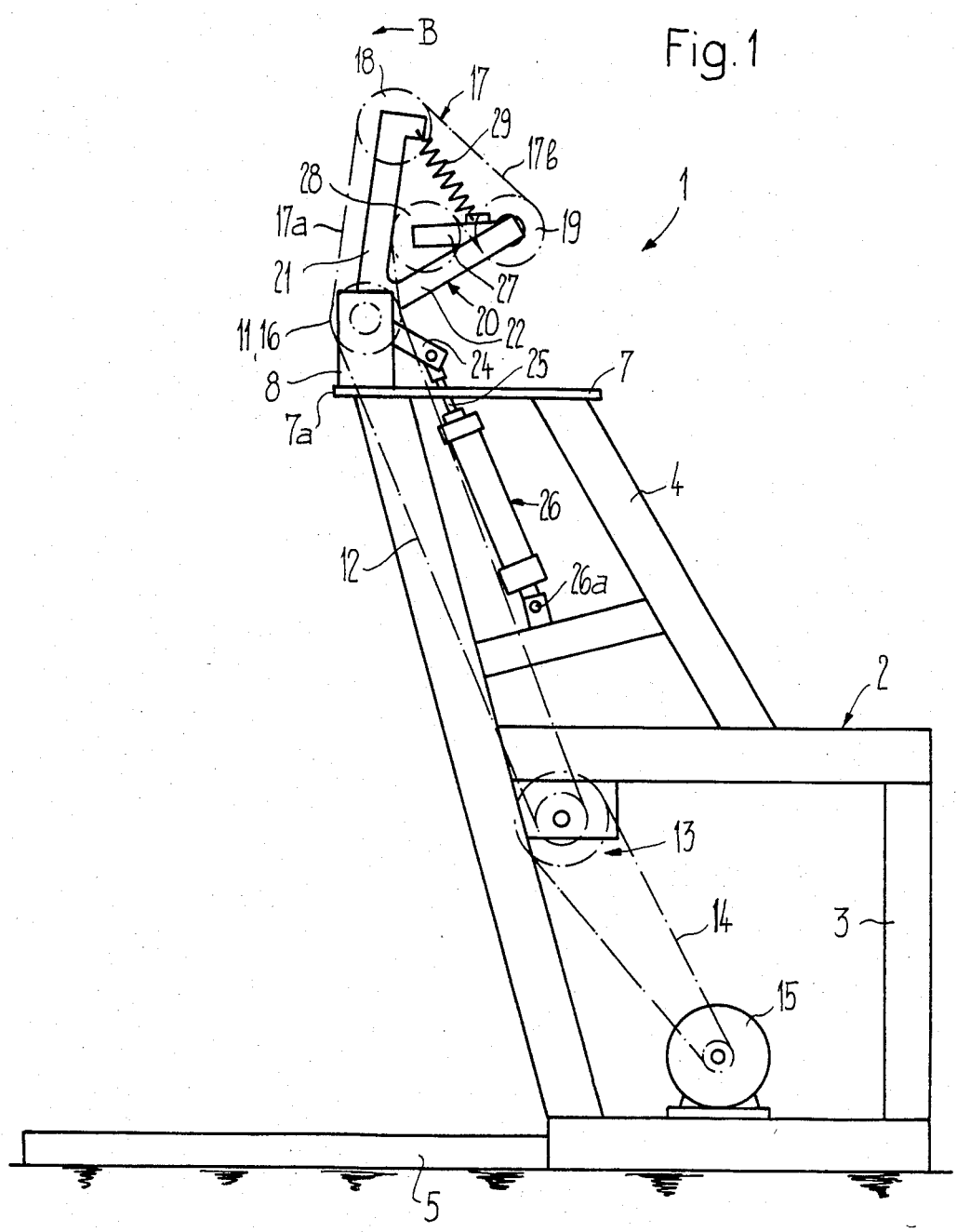

Describing now the drawings, the stationary drive station 1 as illustrated in the drawings comprises a stand or frame unit 2 which includes a base frame 3 supported on the floor and a support structure 4 arranged laterally of the base frame 3 and extending upwardly therefrom. Two guide means or guides 5 and 6 extend from the base frame 3 in spaced substantially parallel relationship to one another. The support structure 4 comprises a platform 7 to which there are mounted two bearing plates 8 and 9 which extend at a distance from and parallel to each other, as best seen by referring to FIG. 3. As will also be seen from FIG. 3, a shaft 10 is rotatably mounted or journaled in the bearing plates 8 and 9. A sprocket wheel or gear 11 is fixedly connected for rotation to the shaft 10, but non-rotatably relative thereto at the exterior side of the bearing plate 8. A sprocket chain 12, which preferably is a roller plate link chain, is guided on the sprocket wheel 11. The chain 12 is driven by a drive motor 15 supported at the base frame 3 via a transmission gear 13 and a further sprocket chain 14 which also is preferably a roller plate link chain.

A first or driving sprocket wheel 16 is mounted on the shaft 10. This sprocket wheel or gear 16 is placed behind the sprocket wheel 11 in the illustration of FIGS. 1 and 2, and thus, is not visible therein. The first sprocket wheel 16 drives a gear or sprocket chain 17 of known design which is flexible to both sides thereof. In addition to the first sprocket wheel 16 the gear chain 17 is furthermore guided on a second sprocket wheel or gear 18 and a third sprocket wheel or gear 19. The driving run or strand 17a of the gear chain 17 is located between the first and second sprocket wheels 16 and 18 while the third sprocket wheel 19 is arranged at the idle or return run or strand 17b and serves to deflect or turn the chain 12. The second and third sprocket wheels 18 and 19 are mounted at a holding structure or holder means 20 which is pivotably journaled at the shaft 10. The holding structure 20 comprises two holding or holder arms 21 and 22 which form an angle therebetween, and at each of the free ends of which a respective one of the second and third sprocket wheels 18, 19 is rotationally journaled. As shown in FIG. 3, the holding arms 21 and 22 are secured to a hub 23 which is rotatably seated on the shaft 10.

A lever 24 extends from the hub 23 and the piston rod 25 of a pneumatic or hydraulic cylinder-and-piston unit 26 acts upon the lever 24. The cylinder-and-piston unit 26 is pivotably mounted at the support structure 4 at location 26a.

Furthermore, there are provided tensioning means for tensioning the drive chain 17 and for maintaining the tensioned state thereof. In the illustrated exemplary embodiment, the tensioning means comprise a lever 27 which is rotatably mounted at the end of the holding arm 22 which carries the third sprocket wheel 19. At its free end the lever 27 carries a tensioning wheel or roll 28 which engages the outer side of the drive chain 17, i.e. that side of the drive chain 17 opposite to the sprocket wheels 16, 18 and 19. At the lever 27 there is mounted one end of a tension spring 29, the other end of which is anchored to the holding arm 21. The tension spring 29 pulls the lever 27, and thus, the tensioning wheel 28 towards the drive chain 17, thereby tensioning the same.

Figure 2:
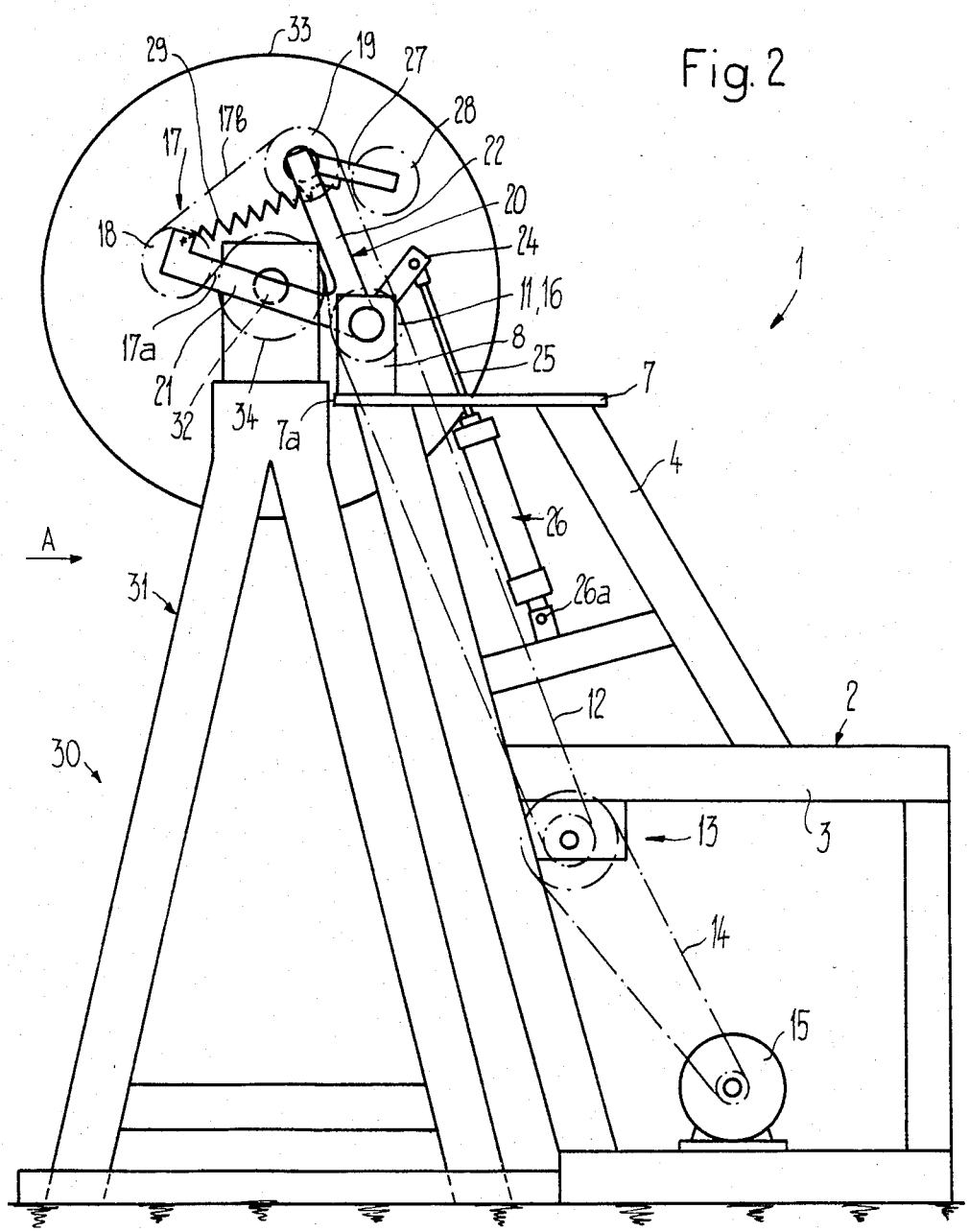
FIG. 2 is a side view of the drive station shown in FIG. 1, but now further depicting the storage unit combined therewith and showing the drive chain in its driving or power transmitting position.
Figure 3:
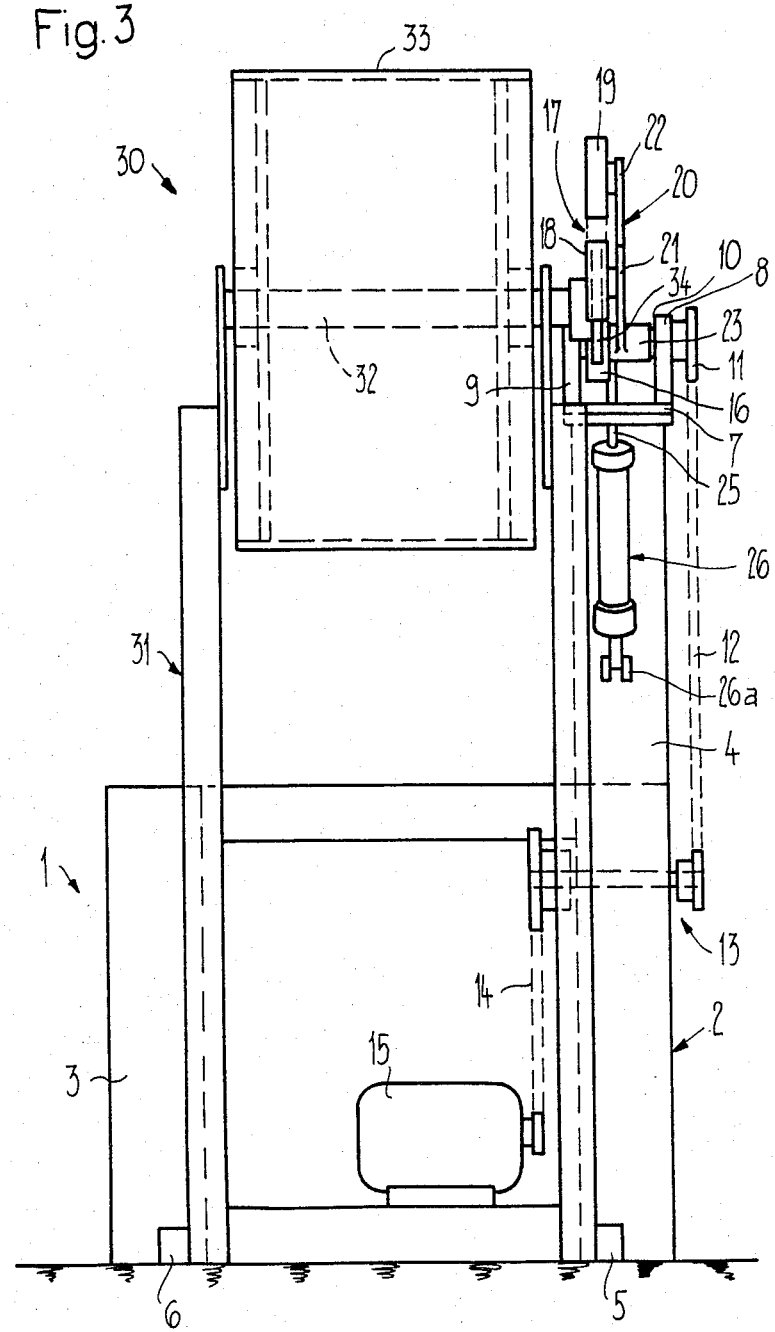
FIG. 3 is an end view of the arrangement shown in FIG. 2 essentially as seen when looking in the direction of the arrow A of FIG. 2.

FIGS. 2 and 3 show a wind-up and storage unit 30 as described in greater detail in the aforementioned U.S. patent application Ser. No. 06/432,557. The wind-up and storage unit 30 comprises a mobile stand 31 forming a base support or mounting block. In the stand 31 a shaft 32 is rotatably journaled and upon which there is seated a cylindrical winding core 33. A further sprocket wheel or gear 34 is rigidly connected for rotation to one end of the rotatable shaft 32. The band spool including the winding band wound-up thereon and connected to the winding core 33 have not been particularly shown in FIGS. 2 and 3. As extensively described in the aforementioned U.S. patent application Ser. No. 06/432,557, flat products, particularly printed products, which arrive in an imbricated formation or product array are wound-up on the winding core 33. The stationary drive station 1 serves to drive the winding core 33 so as to form a product package thereon. When the product package has been completed the driving or drive connection between the drive unit or station 1 and the wind-up and storage unit 30 is disengaged in a manner still to be explained and the latter is exchanged against another wind-up and storage unit having an empty winding core 33. It will be understood, however, that the drive station 1 may also be used to drive a winding core 33 carrying a product package in order to unwind the same therefrom.

The mode of operation of the apparatus described hereinbefore will now be explained.

In the non-operative or rest state of the drive station 1 the drive chain 17 assumes the preparatory or rest position shown in FIG. 1. The piston rod 25 is in its retracted end or terminal position which causes the holding structure 20 to be upwardly pivoted. In this rest or idle position of the drive chain 17 the driving run or strand 17a extends substantially along a straight line while the section of the return run or strand 17b located between the first and third sprocket wheels 16 and 19 is subjected to a deflection caused by the tensioning wheel 28. The gear chain 17 is therefore in a tensioned state.

Using suitable transport means like, for example, a fork lifter or fork lift truck or a manually operated lifting carriage or truck, the wind-up and storage unit 30 including the shaft 32 to be driven are conveyed to the drive station 1. During this operation the guide means 5 and 6, as shown in FIG. 3, serve to laterally align the stand 31 of the wind-up and storage unit 30. The wind-up and storage unit 30 is displaced towards the stand 2 of the drive station 1 to such an extent that the stand 31 of the wind-up and storage unit 30 abuts the front surface or face 7a of the platform 7 which serves as stop means. Accordingly, there is also achieved an alignment of the wind-up and storage unit 30 with respect to the infeed or placement direction thereof. When the wind-up and storage unit 30 has assumed the correct position, then the piston rod 25 is extended or forwardly thrusted by appropriately operating the piston-and-cylinder unit 26, whereby the holding structure 20 is pivoted in the direction indicated by the arrow B in FIG. 1. During this pivoting movement the outer side of the driving run or strand 17a bears against the sprocket wheel 34 seated on the shaft 32 to be driven and extends around such sprocket wheel 34 along part of the circumference thereof, as shown in FIG. 2. In comparison to the preparatory or rest position shown in FIG. 1, this means that the driving run or strand 17a of the drive chain 17 is extended or elongated. The chain length required for this purpose is obtained by straightening the section of the return run or strand 17b which is located between the first and third sprocket wheels 16 and 19 as shown in FIG. 2. During this operation the lever 27 including the tensioning wheel 28 are pivoted against the force of the tension spring 29. The tensioning wheel 28 now is pressed against the gear chain 17 due to the now tensioned tension spring 29, in order to thus maintain the drive chain 17 sufficiently strongly tensioned during the driving operation. The drive motor 15 is then activated, and consequently, the drive chain 17 is driven by the first sprocket wheel 16. The drive chain 17, in turn, drives the sprocket wheel 34, and thus, the winding core 33.

To disengage or release the driving connection between the drive chain 17 and the sprocket wheel 34 the piston rod 25 is retracted, whereby the holding structure 20 is again upwardly pivoted into the rest position shown in FIG. 1. When the drive chain 17 has been disengaged from the sprocket wheel 34 then the driving run or strand 17a is re-straightened or stretched. The shortening of the driving strand 17a is compensated for by a corresponding elongation or enlargement of the chain section running between the first and third sprocket wheels 16 and 19, as shown in FIG. 1. The drive station 1 is now prepared to be coupled with another wind-up and storage unit.

It is necessary to ensure that at each further sprocket wheel 34 of the different wind up and storage units 30 and the drive chain 17 a correct and faultlessly functioning driving connection can be established under all conditions. To achieve this purpose without requiring any time-consuming and laborious adjusting and registering operations various measures have been provided in the drive mechanism described hereinbefore.

Firstly, the drive chain 17 has a greater width, for example, by a factor of 2 to 3, than the sprocket wheel 34 mounted on the shaft 32 to be driven. This allows for some tolerance in the direction of the axis of the shaft 32 intended to be driven when the wind-up and storage unit 30 is placed into position. The distance between the two guide means or guides 5 and 6 therefore, may be somewhat greater than the width of the stand 31 of the wind-up and storage unit 30, which, in turn, facilitates the introduction and entry of the stand 31 between the guide means 5 and 6.

Secondly, the circumstance that the further sprocket wheel or gear 34 to be driven is engaged or entrained along part of its circumference by the drive chain 17 and that the chain tensioning means 27, 28, 29 contains a long tensioning travel path permits a certain compensation transversely with respect to the axis of the shaft 32 to be driven in horizontal and in vertical direction. This means that a faultless driving connection is also established even when the shafts 32 containing the further sprocket wheels 34 of the various wind-up and storage units 30 assume mutually differing positions with respect to height, towards the sides as well as with respect to the infeed or placement direction. By designing the drive station 1 in the manner described it thus becomes possible to introduce the wind-up and storage units 30, by using suitable transport or conveying means, between the guide means or guides 5 and 6, to push the same forwards into abutment with the front face 7a of the platform 7 and to then set down the same. No further alignment and adapting or adjusting operations are required. The driving or drive connection is solely established by pivoting the holding structure 20 as heretofore described.

It is also conceivable, as a variant from the embodiment shown and described, to design the drive chain 17 such that instead of it being pivotable between a rest position and a drive position, the drive chain 17 is permanently maintained in the drive position shown in FIG. 2. This means that the further sprocket wheel 34 seated on the shaft 32 to be driven must be displaced in a suitable manner towards and brought into operative engagement with the driving run or strand 17a of the drive chain 17, so that the driving run or strand 17a can extend along part of the circumference of the further sprocket wheel 34.

It will be understood that the apparatus described hereinbefore can be designed in a still different manner from that described and shown as concerns other parts or components thereof. Thus, it would be possible, for example, to displace the drive chain 17 in a different manner between the rest position and the operative position thereof.

While the drive mechanism illustrated and described hereinbefore is particularly suited for driving the winding cores 33 of wind-up and storage units 30 for printed products and other flat products, it is also conceivable with such drive mechanism to drive the shafts of other mobile structural units or groups which only intermittently have to be in driving connection or relationship with the drive mechanism. For example, tractor vehicles used for agricultural purposes may be provided with such a drive mechanism for driving the various devices or implements which can be coupled to the tractor vehicle.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A drive mechanism for driving a shaft of a mobile apparatus, comprising:
   a drive unit releasably engageable with the shaft for driving the latter;
   said drive unit comprising:
      a drive chain having an inner side and an outer side;
      three sprocket wheels for guiding said drive chain at said inner side thereof;
      one of said three sprocket wheels defining a driven sprocket wheel;
      a further sprocket wheel mounted on said shaft to be driven;
      said drive chain being engageable on said outer side thereof with said further sprocket wheel in order to extend around part of the circumference thereof and being disengageable therefrom;
      tensioning means for maintaining said drive chain in a tensioned state when out of engagement with said further sprocket wheel mounted on said shaft to be driven;
      said tensioning means comprising a tension wheel coacting with a return run of said drive chain; and
      said tensioning wheel being arranged on said outer side of said drive chain.

2. The drive mechanism as defined in claim 1, wherein:
   said drive chain has a greater width than said further sprocket wheel mounted on said shaft to be driven.

3. The drive mechanism as defined in claim 1, further including:
   spring means for loading said tensioning wheel.

4. The drive mechanism as defined in claim 1, wherein:
   said tensioning means further comprises a pivotable lever to which said tensioning wheel is mounted; and
   a tensioning device acting upon said pivotable lever to urge said tensioning wheel towards said drive chain.

5. The drive mechanism as defined in claim 4, wherein:
   said tensioning device comprises a spring.

6. The drive mechanism as defined in claim 1, further including:
   means for displacing said drive chain between a rest position and a drive position in which said drive chain engages said further sprocket wheel mounted on said shaft to be driven.

7. The drive mechanism as defined in claim 6, wherein:
   said displacing means contains structure for pivotably mounting said drive chain.

8. The drive mechanism as defined in claim 7, wherein:
   said pivotably mounting structure comprises a holding structure for rotatably mounting at least a number of said sprocket wheels.

9. The drive mechanism as defined in claim 8, wherein:
   the other of said two sprocket wheels defines a driving sprocket wheel having an axis; and
   said holding structure is arranged to be pivoted about said axis of said driving sprocket wheel.

10. The drive mechanism as defined in claim 9, wherein:
    said displacing means comprises means for pivoting said holding structure.

11. The drive mechanism as defined in claim 10, wherein:
    said pivoting means comprise a fluid-operated cylinder-and-piston unit.

12. The drive mechanism as defined in claim 8, wherein:
    said tensioning means comprises a tensioning wheel coacting with a return run of said drive chain; and
    said tensioning wheel being arranged to be pivoted along with said holding structure.

13. The drive mechanism as defined in claim 1, wherein:
    said drive chain comprises a gear chain.

14. The drive mechanism as defined in claim 13, wherein:
    said gear chain is structured to be flexible to both sides thereof.

15. The drive mechanism as defined in claim 1, wherein:
    said drive unit comprises a stationary drive unit;
    a product storage means containing a mobile frame and a rotatable winding core; and
    said winding core being rotatably driveable by said stationary drive unit.

16. A drive mechanism selectively engaging the driven sprocket wheel of a mobile apparatus for driving the mobile apparatus, comprising:
    a drive chain having an inner side and an outer side;
    a drive sprocket wheel having an axis of rotation;
    a first idler sprocket wheel and a second idler sprocket wheel;
    said drive sprocket wheel and said first and second idler sprocket wheels conjointly guiding said drive chain at said inner side;
    a holding structure capable of performing a pivoting motion about said axis of rotation of said drive sprocket wheel for rotatably supporting said drive sprocket wheel, said first idler sprocket wheel and said second idler sprocket wheel in mutually fixed spaced relationship;
    said drive chain including a first drive run extending from said drive sprocket wheel to said first idler sprocket wheel, a first return run extending from said first idler sprocket wheel to said second idler sprocket wheel and a second return run extending from said second idler sprocket wheel to said drive sprocket wheel;
    a tension sprocket wheel movably mounted on said holding structure for continuously engaging said outer side of said drive chain at one of said first and second return runs and maintaining said drive chain under tension; and
    said pivoting motion of said holding structure causing said outer side of said drive chain at said drive run thereof to selectively engage and disengage part of the circumference of said driven sprocket wheel of the apparatus.

* * * * *